United States Patent [19]

Haeder

[11] 4,087,190

[45] May 2, 1978

[54] CABLE SLEEVE WITH A CLAMPING RAIL

[75] Inventor: Wolfgang Haeder, Eichenau, Germany

[73] Assignee: Siemens Aktiengesellschaft, Berlin & Munich, Germany

[21] Appl. No.: 802,713

[22] Filed: Jun. 2, 1977

[30] Foreign Application Priority Data

Jun. 28, 1976 Germany .............................. 7620440

[51] Int. Cl.² ............................................. F16G 11/02
[52] U.S. Cl. ........................................ 403/313; 24/25; 24/268; 138/99
[58] Field of Search ................. 24/268, 136 R, 136 B, 24/25; 138/99; 403/309, 313, 314, 316, 317, 209; 285/419, 373, 421; 339/75 P, 103 R, 103 C, 104, 107

[56] References Cited

U.S. PATENT DOCUMENTS

| 224,397 | 2/1880 | Crook | 24/25 |
|---|---|---|---|
| 1,351,366 | 8/1920 | Bowman | 403/309 |
| 2,027,824 | 1/1936 | Hunt | 285/383 |
| 2,403,839 | 7/1946 | Adolph | 285/419 |

FOREIGN PATENT DOCUMENTS

| 421,634 | 4/1926 | Germany | 285/421 |
|---|---|---|---|
| 2,158,922 | 11/1971 | Germany. | |

*Primary Examiner*—Kenneth J. Dorner

*Attorney, Agent, or Firm*—Hill, Gross, Simpson, Van Santen, Steadman, Chiara & Simpson

[57] ABSTRACT

A cable sleeve having a tubular member with a longitudinally extending slit with longitudinal wedge-shaped flanges along each side, which slit is held in a closed sealing relationship by wedge-shaped clamping rails characterized by an improvement comprising each of the clamping rails having a projection or embossment having an opening therethrough and a tightening band or strap extending through the opening with one end being provided with means for preventing passage of the one end through the opening of the projection, and the band having means for fixing the other end of the band to the cable sleeve so that during assembly of the clamping rail on the wedge-shaped portion, a tension force applied to the band forces the rail into the assembled position and the means for fixing prevents the accidental disassembly of the rail from the member. In a preferred embodiment, the cable sleeve has a pair of wedge-shaped portions and a pair of clamping rails are utilized. Each rail has the projection with an opening with the band extending therethrough so that during assembly a tension force applied to the band forces the rails together and into the assembled position and the means for fixing causes the tightening band to prevent the accidental disassembly of the two rails from the member.

10 Claims, 3 Drawing Figures

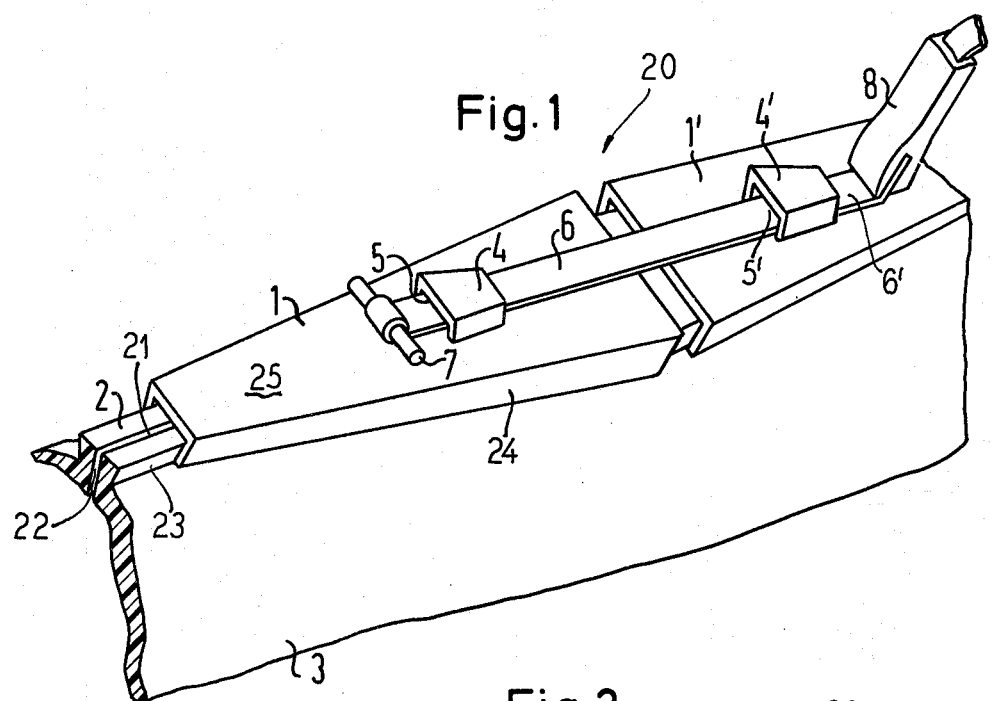
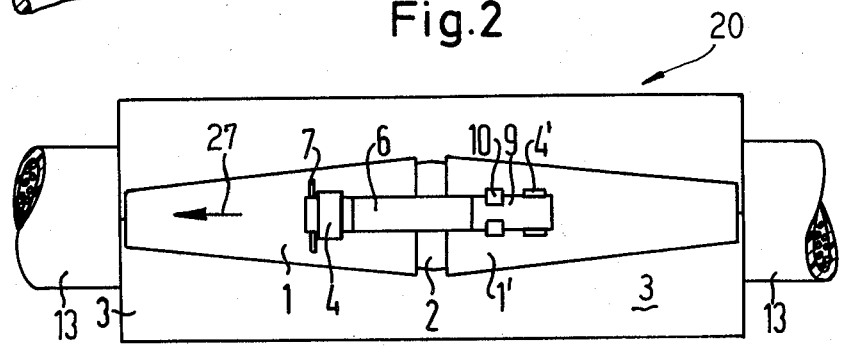
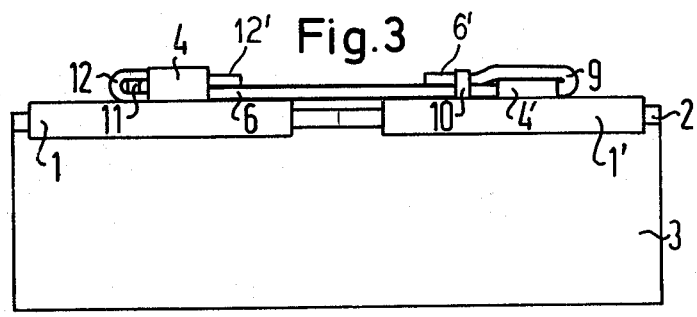

CABLE SLEEVE WITH A CLAMPING RAIL

BACKGROUND OF THE INVENTION

1. Field of the Invention

The present invention is directed to cable sleeve comprising a tubular member with a longitudinally extending slit with wedge-shaped flanges therealong, and a wedge-shaped clamping rail for locking the flanges together in a sealing relationship.

2. Prior Art

In the cable sleeve art, a problem with sealing a longitudinally extending slit of the cable sleeve is of a prime importance and many different types of locking or sealing arrangements are known. In many cases, a sealing compound is inserted between the surfaces forming the slit and these surfaces are pressed together with considerable pressure by means of clamping elements. For example, the surfaces of the slit may be integrally formed on flanges of the sleeve member and a plastic sealing compound or member is inserted between these surfaces. To obtain the required sealing pressure on the sealing compound which pressure will be evenly distributed in such a manner that no air may penetrate into the sleeve, pressure or clamping screws acting on the flange are utilized.

A different locking possibility comprises providing integral reinforcements or flanges on the sleeve member, which reinforcements or flanges extend along side of the slit and receive clamps which extend across the slit and apply pressure to the flanges. This type of reinforcement or flange, as disclosed in German Offenlegungsschrift No. 2,158,992, can also utilize clamping rails, which extend across the slit and press the flanges together. If the flanges or reinforcements have a continuous cross section along their entire length, the mounting of the rail on the flanges is extremely difficult due to the fact that the rails have a constant cross section and that the force to slip the rail along the length of the flanges must overcome the frictional forces created by the rail applying pressure to seal the slit. To overcome this problem, the flanges or reinforcements as well as the clamping rails have been formed with a wedge-shape. In this manner, the clamping rail can be more easily assembled on the flanges or reinforcements with much less force. In addition, additional sealing pressures are produced as the rails are slipped or moved further on the wedge-shaped reinforcement, and the structure of the wedge-shaped rails and flanges ensures an even distribution of the sealing force on the total area of the surfaces defining the slit of the tubular member. However, these forces are still sufficiently high so that in many instances a suitable tool is required for assemblying the rail on the flanges. Moreover, a danger always exists that the clamping rail, due to the wedge-shaped construction, will slide off or become disassembled from the flanges or slip on the flanges to lower the sealing pressure or force on the slit.

SUMMARY OF THE INVENTION

The present invention is directed to an improvement in a cable sleeve utilizing clamping rails so that the required sealing pressure can be obtained with conventional means and the sealing system is safeguarded against inadvertent release of the sealing pressure.

To accomplish these tasks, the invention provides an improvement in a cable sleeve having a tubular member with a lontigudinally extending slit with longitudinally extending flanges along each side, said flanges having first surfaces facing each other and second surfaces facing away from the first surfaces and diverging from the first surfaces so that each of said flanges has at least one portion with a tapering wedge-shaped configuration, and a clamping rail for each portion, each rail having a pair of diverging legs interconnected by a bight portion so that when the clamping rail is assembled on the portion of the flanges, the legs engage the second surfaces to force the first surfaces of the flanges into a sealing relationship. The improvement in this cable sleeve comprises each clamping rail having a projection having on opening therethrough and a tightening band extending through the opening, said tightening band being provided at one end with means for preventing passage of said one end through the opening of the projection and having means for fixing the other end of the band to the cable sleeve member so that during assembly of the clamping rail on the wedge-shaped flanges, a tension force applied to the band forces the rail into the assembled position and the means for fixing prevents an accidental disassembly of the rail from the member.

Preferably, the second surfaces of each of the flanges diverges away from the first surface so that each of the flanges has a tapered wedge-shaped portion from each end thereof with the maximum thichness being adjacent the middle thereof and a pair of clamping rails are utilized and are interconnected by the tightening band when in the assembled position to prevent accidental disassasembly of the clamping rails from the tubular member of the cable sleeve. In each of the embodiments, the means for preventing may be either a pin secured on the one end or the one of the band is formed into a loop with a free end of the band being inserted back through the opening of the projection and a pin received in the loop. The means for fixing may include a tension lock for preventing movement of the band through the opening of the projection of the other clamping rail or a clamping ring holding a free end of the band, which has been bent into a loop, on a portion of the band extending between the two projections so that the projection of the clamping rail is encircled in the loop of the band.

An essential part of the invention is that by means of utilizing a tightening band or strap an even distribution of force is obtained on the areas covered by the clamping rails. The tension band is inserted through the opening in the projection of the clamp rail with one end being provided with means to prevent its passage through the opening and the free end being gripped by a tension tool. By operating the tension tool, which is braced on a suitable device, for example on the sleeve member itself, a tension or pulling force is applied on the band and transferred to the clamping rail to pull it onto the wedge-shaped flange to the desired assembled position. The clamping rail is finally safeguarded against accidental removal from the flanges by suitable attachment or fixing of the band to the sleeve member.

In the preferred embodiment, the cable sleeve utilizes two wedge-shaped clamping rails in accordance with the present invention and the flanges of the tubular member have a double wedge-shaped configuration with the thickest portion of the wedges being between the ends of the flanges. The clamping rails are moved or pulled toward each other to the assembled position by pulling on the free end of the band with a tension tool which can be braced against the projection of the nearest rail. Thus, a pulling force applied to the band will move both rails toward the assembled position. After the clamping rails are pulled toward each other to obtain the desired locking pressure on the sealing system, the band is finally fixed to the other clamping rail by means of either a tension lock or by means of clamping rings gripping a bent over end of the band. With the application of the fixing means, the two rails are interconnected and accidental disassembly of either rail is prevented.

BRIEF DESCRIPTION OF THE DRAWINGS

FIG. 1 is a perspective view with portions broken away for purposes of illustration showing the improved cable sleeve in accordance with the present invention;

FIG. 2 is a top plan view of the cable sleeve of the present invention; and

FIG. 3 is an enlarged side view of the cable sleeve of the present invention illustrating modifications therein.

DESCRIPTION OF THE PREFERRED EMBODIMENTS

The principles of the present invention are particularly useful in a cable sleeve generally indicated at 20 which is adapted to receive a pair of cables 13 (FIG. 2).

The cable sleeve 20 includes a tubular member 3 of water-proof plastic material which member 3 has a lontigudinal slit 21 which is defined by flanges or reinforcements 2. As illustrated, each of the flanges 2 has a first surface 22 which faces the first surface of the adjacent flange to define the slit 21. The first surfaces 22 may form the seal of the slit or may receive a sealing compound or member (not illustrated). Each of the flanges 2 has a second surface 23, which diverges away from the first surface and preferably from each end of the tubular member 3 so that each of the flanges 2 has a tapering wedge-shaped portion extending from each end toward the middle with the maximum thichness being adjacent the middle of the flanges 2. It is noted that each of the second surfaces 23 has a slight undercut to form a keystone configuration which will be discussed hereinafter.

To hold the flanges 2 in the sealing relationship, a pair of clamping rails 1 and 1', which are identical, are utilized. Each of the clamping rails, such as the clamping rail 1, has a pair of diverging legs 24 which are interconnected by a bight portion 25 so that the clamping rail has a wedge-shaped configuration corresponding to the wedge-shaped portion of the pair of flanges 2 of the tubular member 3. In addition to being diverging, each of the legs 24 slightly converge inward from the bight portion 25 so that when the rail such as 1 is assembled on the flanges 2, it can only be removed by longitudinal movement along the flanges.

Each of the clamping rails 1 and 1' is provided with a projection or embossment 4 and 4', respectively. For example, if the clamping rail is formed of a sheet metal material, the embossment or projection 4 can be formed by a stamping operation and has an opening 5, which allows the passage of a tightening band or strap 6 therethrough. As illustrated, the band or strap 6 at one end is provided with means to prevent passage of the one end through the opening 5 of the projection 4. This means for preventing in FIG. 1 is illustrated as a pin 7 which is secured to the one end of the band 6. As illustrated in FIG. 2, the band 6 has been wrapped around the pin 7 and preferably beaded or welded thereto.

When assemblying the clamping rails 1 and 1' onto the flanges 2, the strap 6 is inserted through the opening 5 of the projection 4 and the free end is also inserted through the opening 5' of projection 4' of the clamping rail 1'. A portion 6' of the free end which has been inserted through the projection 4' is gripped by a tension tool 8. To force the two rails 1 and 1' toward each other and onto the wedge-shaped flanges 2 to apply the necessary or desired sealing pressure to close the slit 21, the tool 8 is braced against a projection such as 4' to apply a tensioning force on the strip 6 to urge and force the two rails 1 and 1' toward each other and into the assembled position. When the two rails 1 and 1' are at the desired assembled position, the rail 1' is affixed to the band 6 such as by clamping the free end portion 6' with a tension lock to prevent removal of the band 6 from the projection 4'. With the rail 1' also affixed to the band 6, the band will guarantee that the locking pressure applied by the clamping rails 1 and 1' on the flanges 2 is maintained and that the clamping rails 1 and 1' will not be accidentally disassembled from the assembled position. As illustrated, each rail 1 and 1' is only provided with one embossment or projection 4. However, additional embossments may be provided to provide additional surfaces on which the clamping tool 8 may be braced during the tensioning of band 6 to pull the rails 1 and 1' into the assembled position.

Instead of affixing or securing the rail 1 to the strap 6 by utilizing a tension lock, the means for affixing can comprise a clamping ring 10 (FIGS. 2 and 3) which engages the free end 6' of the strap 6 which free end 6' has been bent in a loop 9 over the projection 4'. The ring 10 attaches the free end 6' to a portion of the strap 6 which portion extends between the projections 4 and 4' and, therefore, the projection 4' is clamped within loop 9.

As also illustrated in FIG. 3, the means for preventing instead of comprising a pin 7, which is secured to the one end, can comprise the one end being folded into a loop 12 with the free end 12' of the loop being inserted back through the opening 5 of the projection or embossment 4. A square pin 11 is received in the loop 12 and prevents pulling of the loop 12 through the opening 5 of the embossment 4.

In addition to the use of the pin 7 or the combination of loop 12 and pin 11 to prevent passage of the one end through the projection 4, the one end can be looped and secured with a clamp similar to the loop 9 and the clamp 10 of FIG. 3. In addition, the step of fixing the other end of the band to the clamping rail 1' can utilize the loop 12 and pin 11 arrangement illustrated in FIG. 3. In addition, each end of the strap or band 6 can be affixed to the rails 1 and 1' by using a wedge to wedge the band 6 inside of the openings 5 or 5' of the embossments 4 and 4'.

When affixing the tightening bands 6, care should be taken so that the effective point of application of the force on the clamping rail 1 or 1' is as close as possible to the bight portion 24 of the clamping rail. If the point of application is spaced too far from the bight portion, the application of the tensioning force could cause a bending or collapsing of the tubular member 3 of the cable surface particularly in the center area thereof which bending or collapsing would create leaks in the sealing system.

In order to open the cable sleeve 20, the clamping rails 1 and 1' are pulled off from their assembled position by utilizing an opening tool and a tensioning band may also be utilized. In such an instance, the means for affixing the tensioning band 6 to the rail such as 1' is disassembled and either the band 6 is removed from both of the openings of the two embossments 4 and 4' and reinserted in one of the embossments such as 4 in a reverse direction so that the pins such as 7 will transfer a pulling force in the direction of arrow 27 to move the rail 1 out of disengagement with the flanges 2.

Although minor modifications might be suggested by those versed in the art, it should be understood that I wish to embody within the scope of the patent warranted hereon, all such modifications as reasonably and properly come within the scope of my contribution to the art.

I claim:

1. In a cable sleeve having a tubular member with a longitudinally extending slit with longitudinally extending flanges along each side thereof, said flanges having first surfaces facing each other and second surfaces facing away from the first surfaces and diverging away from the first surfaces so that each of said flanges has a tapering wedge-shaped configuration from each end thereof with the maximum thickness being adjacent the middle thereof, and a pair of clamping rails each having a pair of diverging legs interconnected by a bight portion, so that when the clamping rail is assembled on said flanges the legs engage the second surfaces to force the first surfaces of the flanges into sealing relationship to close the slit, the improvement comprising each of the clamping rails having a projection having an opening therethrough, and a tightening band extending through the openings to interconnect the two clamping rails, said tightening band being provided at one end with means for preventing passage of said one end through the opening of the projection of the one of the pair of rails and having means for fixing the other of the pair of clamping rails thereto so that during assembly of the clamping rails on said wedge-shaped flanges a tension force applied to the band forces the rails together into the assembled position and said means for fixing causes the tightening band to prevent accidental disassembly of the rails from the flanges.

2. In a cable sleeve according to claim 1, wherein the means for preventing comprises a pin secured to said one end of the band.

3. In a cable sleeve according to claim 1, wherein the means for preventing comprises said one end of the band being formed in a loop with a free end of the band being inserted back through the opening of said projection and a pin secured in the loop.

4. In a cable sleeve according to claim 1, wherein said means for fixing includes a clamping ring holding a free end of the band on a portion of the band extending between the two projections so that the projection of the other clamping rail is encircled in a loop of the band.

5. In a cable sleeve according to claim 4, wherein the means for preventing comprises a pin secured to said one end of the band.

6. In a cable sleeve according to claim 4, wherein the means for preventing comprises said one end of the band being formed in a loop with the free end of the band being inserted back through the opening of said one projection and a pin inserted in the loop.

7. In a cable sleeve according to claim 1, wherein the means for fixing comprises a tension lock preventing movement of the band through the opening of the projection of the other clamping rail.

8. In a cable sleeve according to claim 7, wherein the means for preventing comprises a pin secured to said one end of the band.

9. In a cable sleeve according to claim 7, wherein the means for preventing comprises said one end of the band being formed in a loop with the free end of the band being inserted back through the opening of said one projection and a pin inserted in the loop.

10. In a cable sleeve having a tubular member with a longitudinally extending slit with longitudinally extending flanges along each side thereof, said flanges having first surfaces facing each other and second surfaces facing away from the first surfaces and diverging away from the first surfaces so that each of said flanges has at least one portion with a tapering wedge-shaped configuration and a clamping rail for each portion, each rail having a pair of diverging legs interconnected by a bight portion, so that when each clamping rail is assembled on said portion of the flanges, the legs engage the second surfaces to force the first surfaces of the flanges into sealing relationship to close the slit, the improvement comprising each clamping rail having a projection having an opening therethrough, and a tightening band extend through the opening, said tightening band being provided at one end with means for preventing passage of said one end through the opening of the projection and having means for fixing the other end of the band to the tubular member so that during assembly of the clamping rail on said wedge-shaped portion, a tension force applied to the band forces the rail into the assembled position and said means for fixing prevents the accidental disassembly of the rail from the member.

* * * * *